(12) United States Patent
Ishida

(10) Patent No.: US 8,365,696 B2
(45) Date of Patent: Feb. 5, 2013

(54) PISTON DEVICE FOR INTERNAL COMBUSTION ENGINES

(75) Inventor: Masao Ishida, Suwa (JP)

(73) Assignee: Teikoku Piston Ring Co., Ltd., Tokyo (JP)

(*) Notice: Subject to any disclaimer, the term of this patent is extended or adjusted under 35 U.S.C. 154(b) by 354 days.

(21) Appl. No.: 12/641,706

(22) Filed: Dec. 18, 2009

(65) Prior Publication Data

US 2010/0162987 A1    Jul. 1, 2010

(30) Foreign Application Priority Data

Dec. 25, 2008 (JP) ................................. 2008-329355

(51) Int. Cl.
*F02F 3/00* (2006.01)

(52) U.S. Cl. ............ 123/193.6; 92/208; 92/227; 92/242; 92/246; 277/221; 277/222; 277/491; 277/436; 277/442

(58) Field of Classification Search ............... 123/193.6; 92/208, 227, 242, 246; 277/221, 222, 491, 277/436, 442

See application file for complete search history.

(56) References Cited

U.S. PATENT DOCUMENTS

| | | | | |
|---|---|---|---|---|
| 1,365,640 | A * | 1/1921 | Copp | 277/475 |
| 1,481,167 | A * | 1/1924 | White | 277/494 |
| 1,560,307 | A * | 11/1925 | Peeler | 277/447 |
| 4,848,212 | A * | 7/1989 | Kawano et al. | 92/158 |
| 5,241,748 | A * | 9/1993 | Ishida | 29/888.074 |
| 6,206,379 | B1 * | 3/2001 | Toshiaki | 277/436 |
| 7,207,571 | B2 * | 4/2007 | Yoshida et al. | 277/434 |

FOREIGN PATENT DOCUMENTS

| | | |
|---|---|---|
| FR | 2568313 A1 | 1/1986 |
| GB | 502695 | 3/1939 |
| GB | 2164418 A | 3/1986 |
| JP | 48-21014 | 3/1973 |

(Continued)

OTHER PUBLICATIONS

European Search Report dated Apr. 5, 2010.

(Continued)

*Primary Examiner* — Nathaniel Wiehe
*Assistant Examiner* — James Kim
(74) *Attorney, Agent, or Firm* — Kratz, Quintos & Hanson, LLP

(57) ABSTRACT

A piston device for internal combustion engines includes a first compression ring and a second compression ring in an outer circumference of a piston, wherein the second compression ring includes a notch extending from the inner circumference to the outer circumference on a lower surface of at least one of a pair of ends of the ring, and a gap between the ring ends at the notch on the second compression ring is larger than a gap between the ring ends of the first compression ring, and a gap between the ring ends at the section other than the notch on the second compression ring is the same or smaller than the gap between the ring ends of the first compression ring, and the second compression ring contains an outer circumferential surface comprised of a tapered surface decreasing the ring radial thickness towards the upper side, and an axial parallel surface formed below the tapered surface. Instead of the axial parallel surface, the second compression ring may utilize a tapered surface with a taper angle smaller than the taper angle of the above tapered surface; or may utilize a tapered surface decreasing the ring radial thickness towards the lower side.

6 Claims, 6 Drawing Sheets

FOREIGN PATENT DOCUMENTS

| | | |
|---|---|---|
| JP | 50-85603 | 7/1975 |
| JP | 58-32153 | 9/1983 |
| JP | 63-2848 | 1/1988 |
| JP | 5-30624 | 2/1993 |
| JP | 5-30624 | 4/1993 |
| JP | 2005-264978 | 9/2005 |

OTHER PUBLICATIONS

Notice of Reasons for Rejection on counterpart application No. 2008-329355 from the Japanese Patent Office dated Apr. 10, 2012 with English translation (9 pages).

* cited by examiner

PISTON DEVICE FOR INTERNAL COMBUSTION ENGINES

BACKGROUND OF THE INVENTION

1. Field of the Invention

The present invention relates to a piston device for internal combustion engines containing compression rings capable of reducing oil consumption during driving at high-speeds and high loads and driving under high-boost conditions.

2. Description of the Related Art

To reduce oil consumption during driving at high-speeds and high-loads and driving under high-boost conditions, the Japanese unexamined utility model application publication No. 5-030624 proposes a compression ring for internal combustion engines. The gap between the both ends of the second compression ring is reduced to the utmost to an extent where the ring ends barely avoid coming in contact, and a notch extending from the outer circumference to the inner circumference is formed on the lower surface of at least one of the ends of the second compression ring, and the gap between the ring ends at the notch on the second compression ring is formed larger than the gap between the both ends of the first compression ring. The Japanese unexamined patent application publication No. 48-21014 proposes a pin 12 provided on the piston 1 for preventing rotation of the ring, and a pair of piston rings 3, 4 including arc-shaped notches formed on the lower surface of the ring ends so as not to interfere with the pin 12. The ring 3 is formed as an undercut ring.

However, on the rings disclosed in the Japanese unexamined utility model application publication No. 5-030624 and Japanese unexamined patent application publication No. 48-21014, the outer circumferential surfaces are both formed as an axial parallel surface so that oil consumption during driving at high-speeds and high-loads and driving under high-boost conditions is still not always satisfactory. The ring disclosed in the Japanese unexamined patent application publication No. 48-21014 contains an arc-shaped notch formed on the lower surface of the ring end so that oil tends to rise upward along the arc-shaped surface.

SUMMARY OF THE INVENTION

An object of the present invention is to reduce oil consumption in a piston device for internal combustion engines during driving at high speeds and high loads and driving under high-boost conditions.

According to an aspect of the present invention, the piston device for internal combustion engines includes a first compression ring and a second compression ring in an outer circumference of a piston, wherein the second compression ring includes a notch extending from the inner circumference to the outer circumference on a lower surface of at least one of a pair of ends of the ring, and a gap between the ring ends at the notch on the second compression ring is larger than a gap between the ring ends of the first compression ring, and a gap between the ring ends at the section other than the notch on the second compression ring is the same or smaller than the gap between the ring ends of the first compression ring, and the second compression ring contains an outer circumferential surface comprised of a tapered surface decreasing the ring radial thickness towards the upper side, and an axial parallel surface formed below the tapered surface.

The second compression ring may include a tapered surface (See FIG. 14 through FIG. 19) having a taper angle smaller than the taper angle of the above tapered surface, instead of utilizing the axial parallel surface (See FIG. 5, FIG. 6, FIG. 8, FIG. 9, FIG. 11, and FIG. 12). The second compression ring may in other words contains an outer circumferential surface comprised of a first tapered surface decreasing the ring radial thickness towards the upper side, and a second tapered surface formed below the first tapered surface and having a taper angle smaller than the taper angle of the first tapered surface.

Moreover, the second compression ring may include a tapered surface (See FIG. 20 through FIG. 25) decreasing the ring radial thickness towards the lower side, instead of utilizing the axial parallel surface (See FIG. 5, FIG. 6, FIG. 8, FIG. 9, FIG. 11, and FIG. 12). The second compression ring may in other words contain an outer circumferential surface comprised of a first tapered surface decreasing the ring radial thickness towards the upper side, and a second tapered surface formed below the first tapered surface and decreasing the ring radial thickness towards the lower side.

The second compression ring may preferably include a cross sectional shape of undercut including a notch on the lower side of the outer circumference of the ring.

In the second compression ring, the notch on the lower surface of the ring end may preferably have a rectangular cross section.

In the second compression ring, the peripheral width of the notch on the lower surface of the ring end may be preferably wider along the inner circumference than the outer circumference of the ring.

In the invention according to claim 1, 2, or 3, the second compression ring contains a notch extending from the inner circumference to the outer circumference on the lower surface of at least one of the ends of the ring; and the gap at the notch on the second compression ring is larger than the gap on the first compression ring, and the gap at the section other than the notch on the second compression ring is the same or smaller than the gap on the first compression ring. When the second compression ring makes contact with the lower surface of the ring groove of the piston during driving at high-speeds and high-loads, the blow-by gas flowing into the ring groove escapes from the inner circumferential side of the ring by way of the notch on the lower surface of the ring end to the outer side, so that a rise in pressure at the piston land above the second compression ring can be prevented and therefore the oil can be prevented from rising upwards. Moreover, when the second compression ring makes contact with the upper surface of the ring groove of the piston during driving under high boost conditions, the upward rise of oil can be reduced because the gap is small. The second compression ring moreover has a tapered surface on the upper section of the ring outer circumference which serves to suppress the oil scraping effect when the ring is rising so that oil consumption can be reduced further.

The invention according to claim 4 is capable of improving the oil scraping effect by way of the undercut.

The invention according to claim 5 suppresses an upward rise of oil, compared to when an arc shape is utilized.

The invention according to claim 6 can prevent an upward rise of oil, and reduce oil consumption further because the blow-by gas can easily enter into the gap during driving at high-speeds and high loads.

DETAILED DESCRIPTION OF THE PREFERRED EMBODIMENTS

Figure 1:
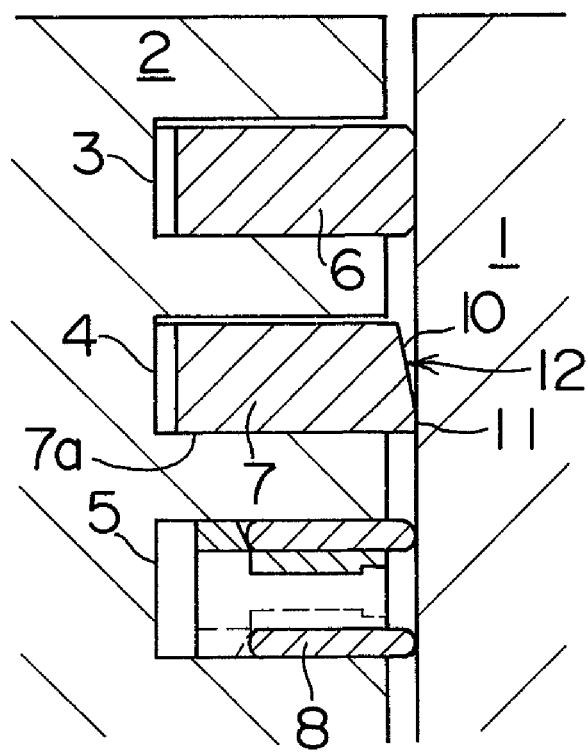
FIG. 1 is a longitudinal cross sectional view of the cylinder section in the internal combustion engine in which the piston device of an embodiment of the present invention is mounted.

An embodiment of the present invention is described next while referring to the drawings.

In FIG. 1, multiple ring grooves 3, 4, and 5 are formed on the outer circumferential surface of a piston 2 that moves back and forth inside a cylinder 1 of an internal combustion engine. A first compression ring 6, a second compression ring 7, and a combined oil ring 8 are respectively installed in the ring grooves 3, 4, and 5 in order from the combustion chamber side. The first compression ring 6 and the second compression ring 7 possess a compression function, and mainly serve to suppress blow-by gas from the combustion chamber and also render the effect of scraping oil on the cylinder wall.

Figure 2:
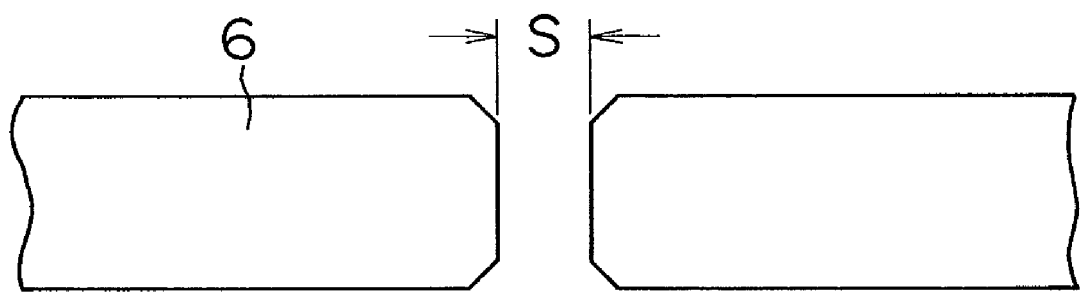
FIG. 2 is a frontal view showing a portion of the first compression ring.
Figure 3:
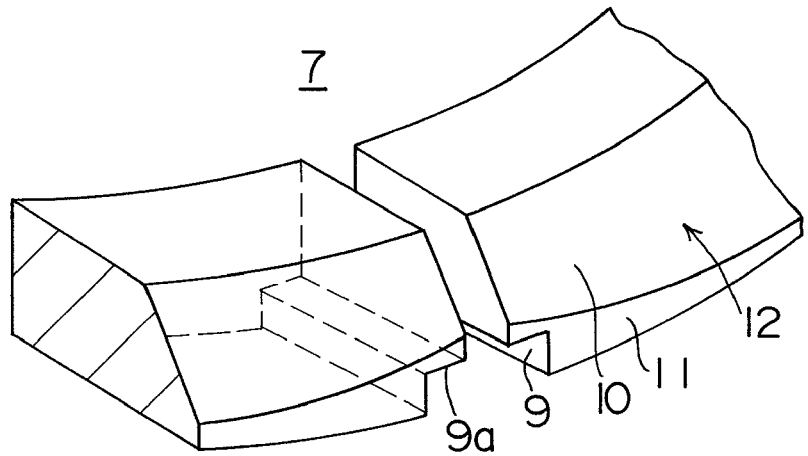
FIG. 3 is a perspective view showing a portion of the second compression ring.
Figure 4:
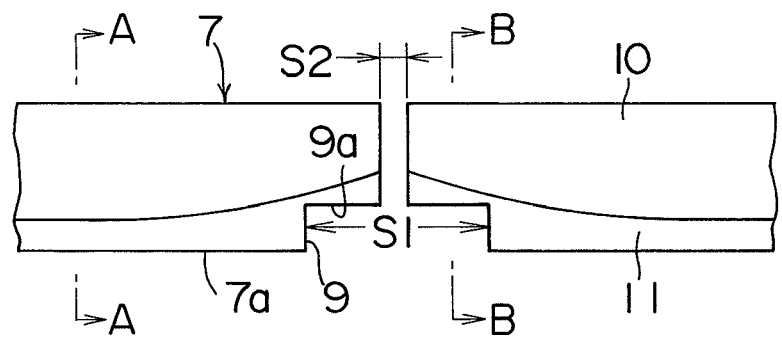
FIG. 4 is a frontal view showing a portion of the second compression ring.
Figure 5:
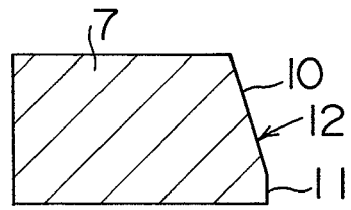
FIG. 5 is a cross sectional view taken along the lines A-A of FIG. 4.
Figure 6:
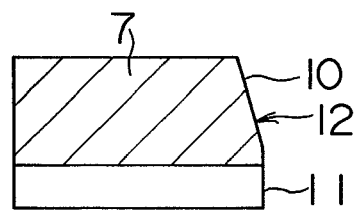
FIG. 6 is a cross sectional view taken along the lines B-B of FIG. 4.

As shown in FIG. 3 through FIG. 6, the second compression ring 7 contains notches 9 having a rectangular cross section and extending from the inner circumference to the outer circumference on the lower surface of the pair of ends of the ring. The gap S1 between the ring ends at the notches 9 on the second compression ring 7 is larger than the gap S between the ring ends of the first compression ring 6 (See FIG. 2.); and the gap S2 between the ring ends at the section other than the notches 9 on the second compression ring 7 is formed the same or smaller than the gap S between the ring ends of the first compression ring 6. The outer circumferential surface 12 includes a tapered surface 10 decreasing the ring radial thickness towards the upper side, and an axial parallel surface 11 formed below the tapered surface 10. The tapered surface 10 and the axial parallel surface 11 are formed across the entire circumference of the second compression ring 7. The boundary between the tapered surface 10 and the axial parallel surface 11 is positioned at a fixed height from the ring lower surface 7a and below the upper surface 9a of the notch 9, in the circumferential positions other than the vicinity of the notches 9. The height of the axial parallel surface 11 rises gradually upward from just before the notch 9 so as not to be split by the notch 9, and reaches a position higher than the upper surface 9a of the notch 9 at the notches 9.

Figure 7:
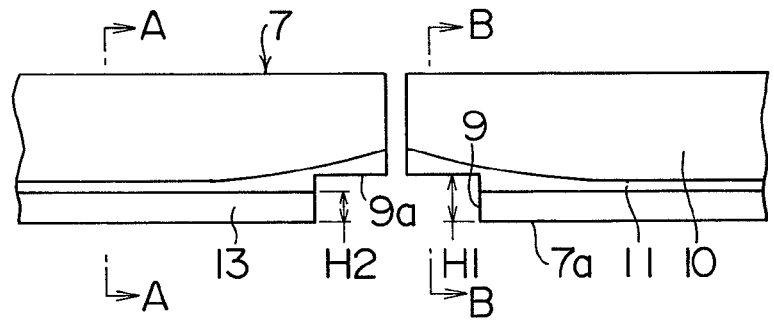
FIG. 7 is a frontal view showing a portion of another second compression ring.
Figure 8:
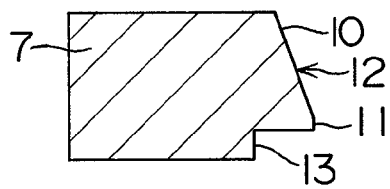
FIG. 8 is a cross sectional view taken along the lines A-A of FIG. 7.
Figure 9:
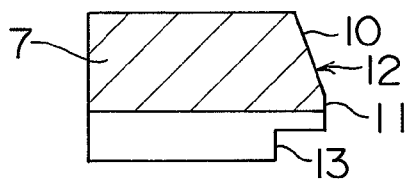
FIG. 9 is a cross sectional view taken along the lines B-B of FIG. 7.

FIG. 7 through FIG. 9 shows another example of the second compression ring of the present invention. The second compression ring 7 of this example differs from the above described second compression ring in the cross sectional shape. The second compression ring 7 of this example has a cross sectional shape of undercut including a notch of a step shape on the lower part of the outer circumferential surface 12.

The second compression ring 7 in this example maintains the relation H1>H2, when H1 is set as the height of the notches 9 on the ring ends from the ring lower surface 7a, and H2 is set as the height of the notch 13 of the undercut from the ring lower surface 7a. A large space for oil to collect is formed by the notches 9 on the ring ends which lower the oil pressure when the ring lowers and the oil is scraped downwards, and therefore the upward rise of oil can be prevented.

Figure 10:
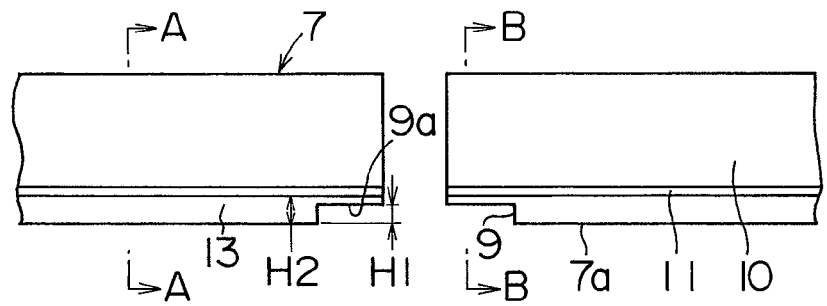
FIG. 10 is a frontal view showing a portion of yet another second compression ring.
Figure 11:
FIG. 11 is a cross sectional view taken along the lines A-A of FIG. 10.
Figure 12:
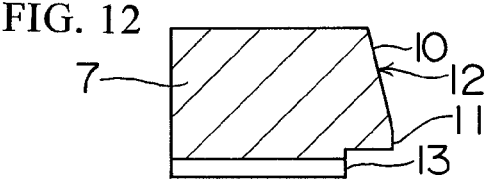
FIG. 12 is a cross sectional view taken along the lines B-B of FIG. 10.

FIG. 10 through FIG. 12 shows still another example of the second compression ring of the present invention. The second compression ring 7 of this example differs from the second compression ring of the previous example in that the relation is H1<H2. The boundary between the axial parallel surface 11 and the tapered surface 10 on the outer circumferential surface 12 of the second compression ring 7 is positioned at a fixed height from the ring lower surface 7a and higher than the upper surface 9a of the notch 9, across the entire circumference of the second compression ring 7.

The second compression ring 7 includes the relation H1<H2 when H1 is set as the height of the notches 9 on the ring ends from the ring lower surface 7a, and H2 is set as the height of the notch 13 of the undercut from the ring lower surface 7a. The boundary between the axial parallel surface 11 and the tapered surface 10 can be formed across the entire circumference of the second compression ring 7 at a fixed position from the ring lower surface 7a and higher than the upper surface 9a of the notch 9, so that the axial width of the ring that makes contact with the wall of the cylinder 1 in the vicinity of the notches 9 on the ring ends can be made smaller, which allows raising the surface pressure on the ring, and achieves a satisfactory oil scraping effect.

Figure 13:
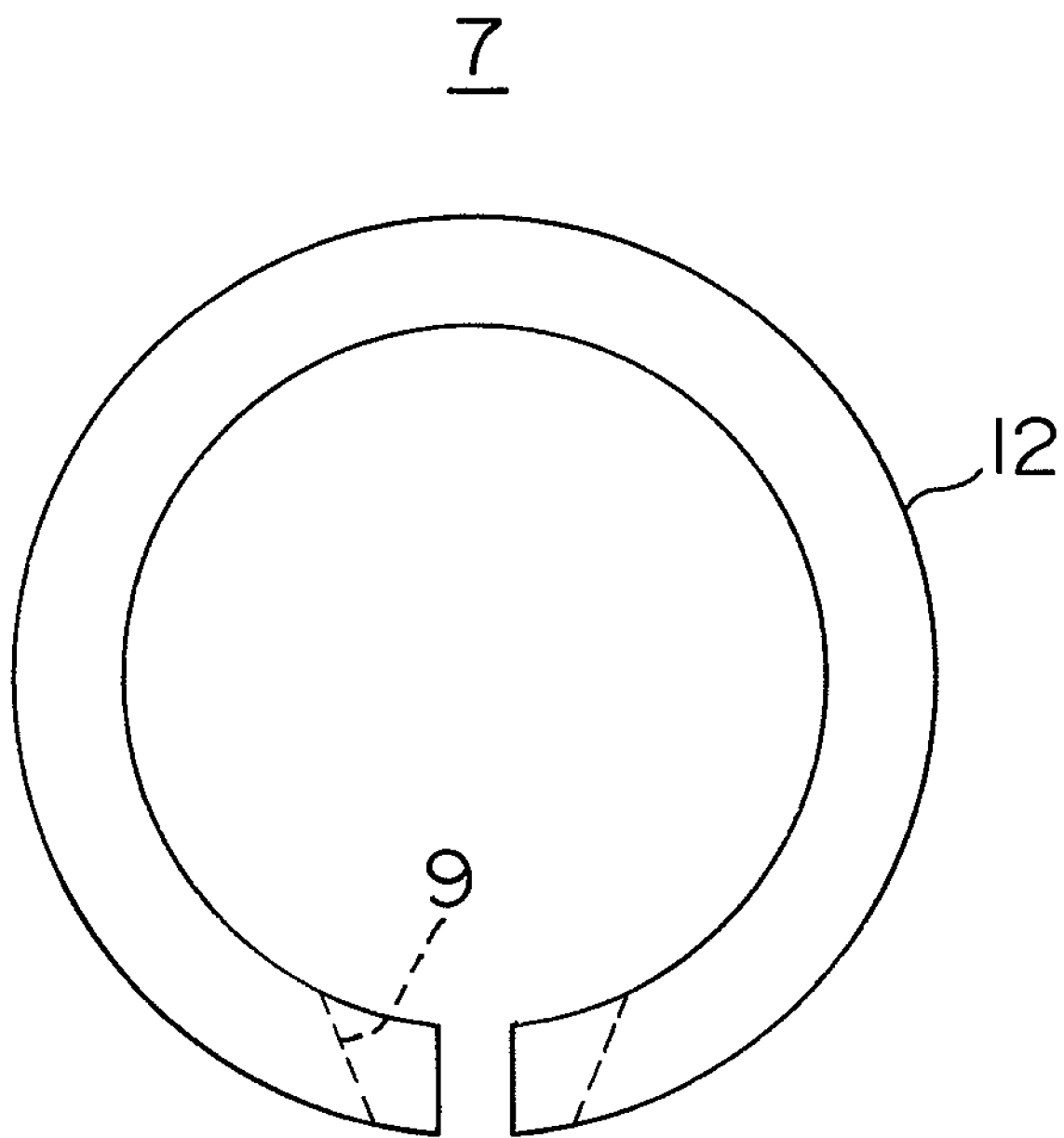
FIG. 13 is a plan view showing the second compression ring.
Figure 14:
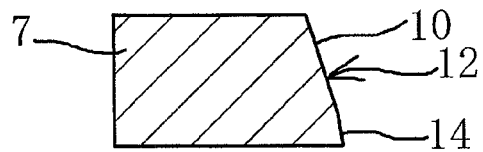
FIG. 14 is a view corresponding to FIG. 5, showing still another second compression ring.
Figure 15:
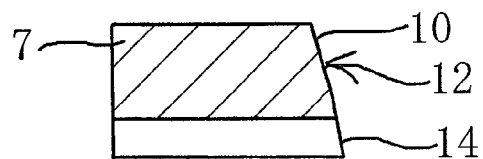
FIG. 15 is a view corresponding to FIG. 6, showing the second compression ring.
Figure 16:
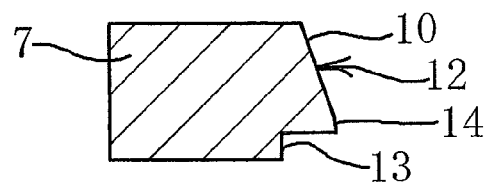
FIG. 16 is a view corresponding to FIG. 8, showing a yet further second compression ring.
Figure 17:
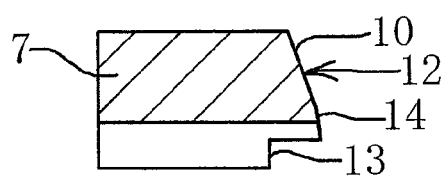
FIG. 17 is a view corresponding to FIG. 9, showing the second compression ring.
Figure 18:
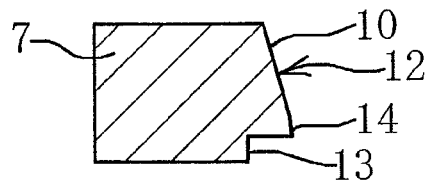
FIG. 18 is a view corresponding to FIG. 11, showing still another second compression ring.
Figure 19:
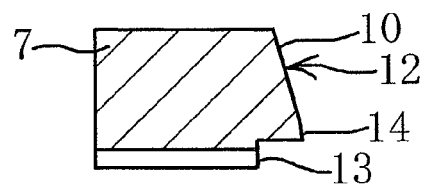
FIG. 19 is a view corresponding to FIG. 12, showing the second compression ring.
Figure 20:
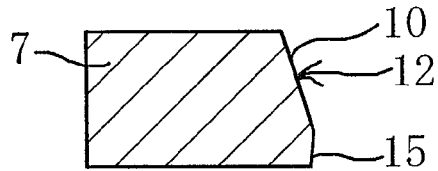
FIG. 20 is a view corresponding to FIG. 5, showing still another second compression ring.
Figure 21:
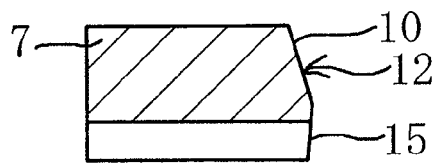
FIG. 21 is a view corresponding to FIG. 6, showing the second compression ring.
Figure 22:
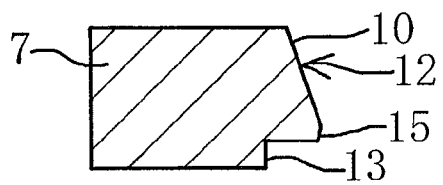
FIG. 22 is a view corresponding to FIG. 8, showing yet a further second compression ring.
Figure 23:
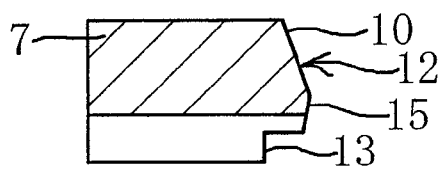
FIG. 23 is a view corresponding to FIG. 9, showing the second compression ring.
Figure 24:
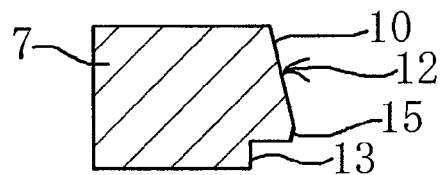
FIG. 24 is a view corresponding to FIG. 11, showing still another second compression ring.
Figure 25:
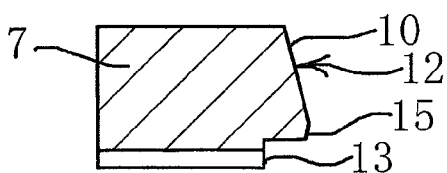
FIG. 25 is a view corresponding to FIG. 12, showing the second compression ring.

FIG. 13 is a plan view of the second compression ring 7. As can be seen in the figure, the peripheral width of the notch 9 on the ring end is wider along the inner circumference than the outer circumference. Providing the above described second compression ring 7 with this structure will allow the blow-by gas to easily flow into the gap so that the upward rise of oil can be prevented, and oil consumption can be reduced further.

In the above embodiments, the notches are formed on the lower surface of the pair of ends of the second compression ring, however, the present invention is not limited to this structure, and a notch for example may be formed on the lower surface of at least one of the pair of ends of the second compression ring.

In the above embodiments, the outer circumferential surface 12 of the second compression ring 7 has the tapered surface 10 decreasing the ring radial thickness towards the upper side, and the axial parallel surface 11 formed below the tapered surface 10, however, the present invention is not limited to this structure. The outer circumferential surface 12 of the second compression ring 7 may for example have a first tapered surface 10 decreasing the ring radial thickness towards the upper side, and a second tapered surface 14 formed below the first tapered surface 10 and having a taper angle smaller than the first tapered surface 10 (See FIG. 14 through FIG. 19). The outer circumferential surface 12 of the second compression ring 7 may also have a first tapered surface 10 decreasing the ring radial thickness towards the upper side, and a second tapered surface 15 formed below the first tapered surface 10 and decreasing the ring radial thickness towards the lower side (See FIG. 20 through FIG. 25).

The invention claimed is:

1. A piston device for internal combustion engines comprising a first compression ring and a second compression ring in an outer circumference of a piston, wherein
the second compression ring includes a notch extending from the inner circumference to the outer circumference on a lower surface of at least one of a pair of ends of the ring, and a gap between the ring ends at the notch on the second compression ring is larger than a gap between the ring ends of the first compression ring, and a gap between the ring ends at the section other than the notch on the second compression ring is the same or smaller than the gap between the ring ends of the first compression ring, and
the second compression ring contains an outer circumferential surface comprised of a tapered surface decreasing the ring radial thickness towards the upper side, and an axial parallel surface formed below the tapered surface, and
the boundary between the tapered surface and the axial parallel surface is positioned below the upper surface of the notch in the circumferential positions other than the vicinity of the notch and rising upward from just before the notch so as not to be split by the notch and reaching a position higher than the upper surface of the notch at the notch.

2. A piston device for internal combustion engines comprising a first compression ring and a second compression ring in an outer circumference of a piston, wherein
the second compression ring includes a notch extending, from the inner circumference to the outer circumference on a lower surface of at least one of a pair of ends of the ring, and a gap between the ring ends at the notch on the second compression ring is larger than a gap between the ring ends of the first compression ring, and a gap between the ring ends at the section other than the notch on the second compression ring is the same or smaller than the gap between the ring ends of the first compression ring, and
the second compression ring contains an outer circumferential surface comprised of a first tapered surface decreasing the ring radial thickness towards the upper side, and a second tapered surface decreasing the ring radial thickness towards the upper side formed below and adjoining the first tapered surface and having a taper angle smaller than the taper angle of the first tapered surface as measured from an axial parallel surface, and
the boundary between the first tapered surface and the second tapered surface is positioned below the upper surface of the notch in the circumferential positions other than the vicinity of the notch and rising upward from just before the notch so as not to be split by the notch and reaching a position higher than the upper surface of the notch at the notch.

3. A piston device for internal combustion engines comprising a first compression ring and a second compression ring in an outer circumference of a piston, wherein
the second compression ring includes a notch extending from the inner circumference to the outer circumference on a lower surface of at least one of a pair of ends of the ring, and a gap between the ring ends at the notch on the second compression ring is larger than a gap between the ring ends of the first compression ring, and a gap between the ring ends at the section other than the notch on the second compression ring is the same or smaller than the gap between the ring ends of the first compression ring, and
the second compression ring contains an outer circumferential surface comprised of a first tapered surface decreasing the ring radial thickness towards the upper side. and a second tapered surface formed below and adjoining the first tapered surface and decreasing the ring radial thickness towards the lower side, and
the boundary between the first tapered surface and the second tapered surface is positioned below the upper surface of the notch in the circumferential positions other than the vicinity of the notch and rising upward from just before the notch so as not to be split by the notch and reaching a position higher than the upper surface of the notch at the notch.

4. The piston device for internal combustion engines as claimed in claim 1, 2, or 3, wherein the second compression ring has a cross sectional shape of undercut including a notch on the lower side of the outer circumference of the ring.

5. The piston device for internal combustion engines as claimed in claim 1, 2, or 3, wherein the notch on the lower surface of the ring end has a rectangular cross section.

6. The piston device for internal combustion engines as claimed in claim 1, 2, or 3, wherein the peripheral width of the notch on the lower surface of the ring end is wider along the inner circumference than the outer circumference of the ring.

\* \* \* \* \*